Dec. 8, 1959 H. A. TOULMIN, JR 2,916,386
METHOD OF CONCENTRATING FRUIT JUICES
Filed July 25, 1955
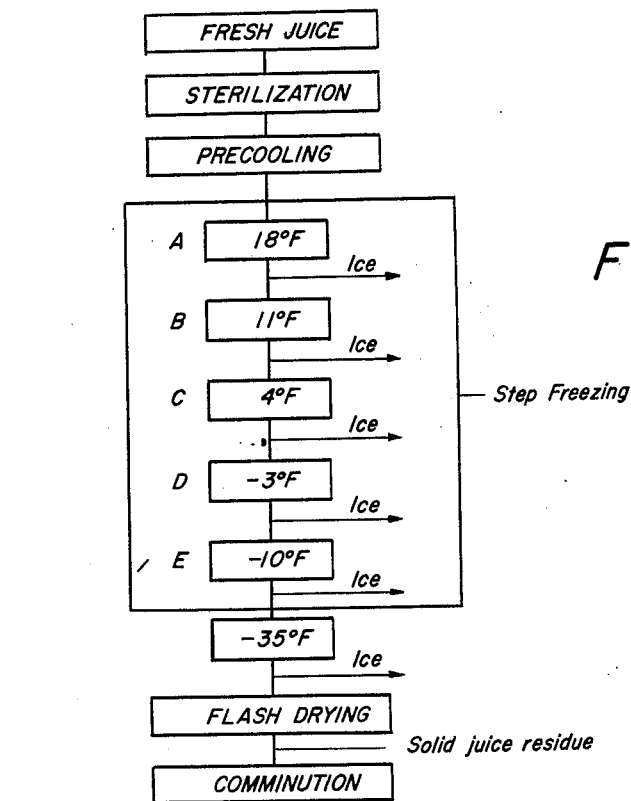
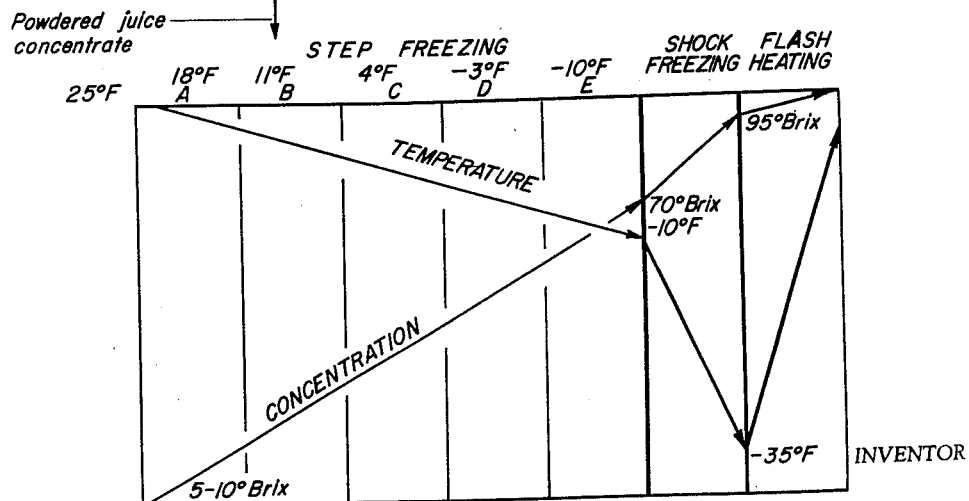
INVENTOR
HARRY A. TOULMIN, JR.
BY
ATTORNEYS United States Patent Office 2,916,386
Patented Dec. 8, 1959

2,916,386

METHOD OF CONCENTRATING FRUIT JUICES

Harry A. Toulmin, Jr., Dayton, Ohio, assignor, by mesne assignments, to Union Carbide Corporation, New York, N.Y., a corporation of New York Application July 25, 1955, Serial No. 524,190

1 Claim. (Cl. 99—205)

The present invention relates to the concentration of heat-sensitive liquids containing solids, more particularly, to a method of low temperature dehydration of fruit juices and the like to obtain a powdered juice concentrate.

It is an object of the method of this invention to step freeze a liquid containing solids to produce progressively smaller crystals and then to shock freeze the concentrate to produce larger crystals to enable removal thereof to overcome the present difficulty that the crystals grow smaller and smaller and cannot be readily centrifuged.

In addition, the frozen concentrates are not entirely satisfactory since they create a storage problem, namely, the frozen concentrate must be stored and transported under a low temperature. In addition, since a quantity of water remains within the concentrate, the concentrates are rather bulky. Therefore, attention has been turned to developing other forms of concentrates which do not require special conditions for storage and which are less bulky. The ideal form of a concentrate which would meet these prerequisites would be in the form of a powder.

A powdered juice concentrate may be readily stored at room temperature and would occupy relatively little space compared to present concentrates since all of the water will have been removed therefrom. The powdered concentrate may be conventionally packaged in small cellophane envelopes and the like for distribution to the ultimate consumer. Powdered concentrates packaged in this manner would not require any special temperature storage conditions.

The problem encountered in reducing citrus juice and other comparable materials to a powdered concentrate form is to retain all of the taste and flavor which is inherent in the fresh juice. The present invention discloses a process for obtaining a powdered juice concentrate which when reconstituted with pure water results in a juice having the same taste and flavor characteristics of the natural fresh juice.

The process of the present invention first comprises freezing out sufficient water from the juice to result in a juice having a concentration of about 70° Brix. A multi-stage freezing process may be used for the initial dehydration. The dehydrated concentrate is next markedly and abruptly reduced in temperature to about —35° F. This results in the further removal of water in the form of large sized elongated ice crystals. The concentrate after this step comprises a mass of low temperature solids. These frozen solids are then dehydrated by a flash drying process. The flash drying process extracts the remaining quantity of water from the juice and the concentrate now comprises all of the solid constituents basically present in the juice. These solids may then be comminuted to obtain a powder having a uniform particle size.

It is therefore the principal object of this invention to provide a novel and improved method of obtaining powdered concentrate of a liquid containing solids.

It is another object of this invention to provide a method of low temperature dehydration of fruit juices and the like wherein the major portion of the water is removed in the form of ice and the concentrate of the juice is in the form of a pulp.

It is an additional object of this invention to provide a method whereby a powdered juice concentrate is obtained by dehydrating the fruit juice and flash heating the resulting concentrate.

Other objects and advantages of this invention will be apparent upon reference to the accompanying description when taken in conjunction with the following drawings:

Figure 1 is a flow chart showing the coordinated steps of this process; and

Figure 2 is a graph showing the variation of the temperature and concentration during the different stages of the process.

At the outset of the process the fresh juice is preferably sterilized. This may be accomplished by subjecting the juice to irradiation from ultra-violet lights for several minutes.

The sterilized juice is then precooled to about 25° F. If desired, the sterilization and precooling steps may be carried out concurrently.

Subsequently, the precooled juice is subjected to a low temperature dehydration process.

In this process the juice is passed through a plurality of freezing zones designated A–E and maintained at the following temperatures—

| | ° F. |
|---|---|
| Zone A | 18 |
| Zone B | 11 |
| Zone C | 4 |
| Zone D | —3 |
| Zone E | —10 |

It will be noted that the temperatures of the zones are progressively decreased in equal decrements.

When the juice has been subjected to the freezing action of each zone for a sufficient time to remove a considerable portion of water in the form of ice crystals, a slushy mass comprising the partially dehydrated liquid and ice crystals is formed. After each freezing step this slushy mass is centrifuged to remove the ice crystals therefrom. The remaining dehydrated juice is conducted to the next freezing step for the removal of additional water.

During each freezing step the juice is vigorously agitated in order that the freezing water may form fine ice crystals of pure water and not adhere to the mechanism. This agitation also prevents the formation of white ice which occurs when air is entrapped in the ice crystals.

When the juice emerges from the final freezing step, zone E, it is at a temperature of the order of —10° F. and has a concentration of about 70° Brix. Approximately 30% of the original amount of water remains in the juice.

The dehydrated juice is then subjected to a marked and abrupt drop in temperature. This process of dehydrating by abruptly and markedly reducing the temperature I call shock freezing or thermal shock.

This drop is of the order of 20° F. to 40° F. and occurs almost instantaneously. The juice will now be at a temperature of about —35° F. to —40° F. This abrupt reduction in temperature of the dehydrate will result in the formation of large sized needle-like ice crystals. The process of forming these ice crystals essentially comprises a trapping of the water remaining in the concentrate. The rapid reduction in temperature will, in effect, force the remaining water to form ice crystals. This second dehydration step will result in a considerable quantity of the remaining water being removed. The resultant concentrate is largely in the form of frozen solids. The manner in which the temperature of the juice and the concentration vary during the entire process is graphically illustrated in Figure 2. The juice may be packed and shipped under low temperatures or may be dried as set forth hereinafter.

The concentrate comprising the frozen solids is next finally dehydrated through a flash drying process. This process essentially comprises passing the frozen solids through a rapidly moving stream of hot, dry air. The stream is maintained at a temperature which is sufficiently high to melt the frozen solids and evaporate the resulting amount of water. Since the stream is rapidly moving, the solid particles of the juice will contact the hot air in a very short period of time. This period of time is not of sufficient length to affect the heat-sensitive constituents of the juice. The solids may be blown either contra the flowing stream or transversely thereof. The process of flash drying is well known and suitable equipment is commercially available for carrying out this process.

If desired, the process of vacuum evaporation of the frozen solids may be employed. By discharging the frozen solids into a chamber maintained under a sub-atmospheric pressure which is below the pressure of ice at room temperature, the ice will be vaporized without passing through the liquid stage. The resulting aqueous vapors are then withdrawn through means of a suitable pump.

The flash heating process is the final dehydrating step in the processing of the juice. Since all the water is now removed, the remaining solid particles are collected. The resultant juice concentrate comprises all the solid matter originally present in the fresh juice and is in the form of crystals or solid particles. These solid particles may next be comminuted to form a powder comprising uniformly sized crystals. This heating process is similar to that disclosed in the U.S. Patent 2,656,276 issued October 20, 1953, to Toulmin. Additional drying processes which can be used are shown in U.S. Patents 2,557,155, 2,509,681, and 2,471,677.

Thus it can be seen that the process of this invention essentially comprises three dehydrating steps. In the first step, low temperature dehydration removes as great a quantity of water as is economically feasible. In the second step, the dehydrated residue is markedly and abruptly reduced in temperature to form large sized ice water crystals which are removed. The removal may be accomplished by centrifuging as done between the steps of the progressive freezing process. The third and final optional step comprises flash heating the frozen solids to remove the remaining water, and to obtain a resultant powdered juice concentrate.

The process of dehydration, as disclosed in this invention, results in all of the solids being retained. In the first dehydrating step it was pointed out that the water is removed in the form of fine, pure ice crystals. Consequently, when these crystals are removed from the dehydrate by centrifuging or the like, very few of the solids of the fresh juice are also removed. The remaining two dehydrating steps are similarly characterized by the loss of very little, if any, of the solids inherent in the natural juice. The end product of the process is either a highly concentrated liquid or a powdered concentrate which retains all of the natural flavor and taste characteristics of the natural product. The consumer need only reconstitute the powdered concentrate by the addition of pure water and the result is a product which is substantially the equivalent of the original fresh material.

It will be understood that this invention is susceptible to modification in order to adapt it to different usages and conditions, and, accordingly, it is desired to comprehend such modifications within this invention as may fall within the scope of the appended claim. This particularly applies to the various temperatures. A wide variety of materials may be treated by this process.

What is claimed is:

In the method of concentrating aqueous heat-sensitive materials having liquids and solids, precooling the material to a temperature of the order of 25° F., progressively decreasing the temperature of the material to about −10° F. in substantially equal decrements of about 7° F. to form ice crystals, removing a portion of the water from the material in the form of said ice crystals and to leave a dehydrated material, abruptly decreasing the temperature of the dehydrated material from −10° F. to about −35° F. to freeze out additional water and to form frozen solids, removing the said frozen water, and flash heating the frozen solids to remove the remaining water therefrom.

References Cited in the file of this patent

UNITED STATES PATENTS

| | | |
|---|---|---|
| 2,436,218 | Malcolm | Feb. 17, 1948 |
| 2,567,038 | Stevens et al. | Sept. 4, 1951 |
| 2,588,337 | Sperti | Mar. 11, 1952 |
| 2,656,276 | Toulmin | Oct. 20, 1953 |
| 2,657,555 | Wenzelberger | Nov. 3, 1953 |
| 2,685,783 | Benscheidt et al. | Aug. 10, 1954 |